United States Patent [19]

Ogurtsov et al.

[11] Patent Number: 5,457,552
[45] Date of Patent: Oct. 10, 1995

[54] LIQUID CRYSTAL DISPLAY WITH SUBPIXELS EACH HAVING TWO TFTS WHERE SOME TFTS HAVE GATE CONNECTIONS THAT SKIP OVER ADJACENT ADDRESS BUS LINES

[75] Inventors: Oleg F. Ogurtsov; Boris I. Kazurov; Boris P. Chernorotov, all of Moscow, Russian Federation

[73] Assignee: Goldstar Co., Ltd., Seoul, Rep. of Korea

[21] Appl. No.: 171,450

[22] Filed: Dec. 22, 1993

[30] Foreign Application Priority Data

Dec. 30, 1992 [RU] Russian Federation ............. 92015971

[51] Int. Cl.[6] .................. G02F 1/1343; G02F 1/1335; G09G 3/36
[52] U.S. Cl. ................. 359/59; 359/68; 359/87; 345/93
[58] Field of Search ........................ 359/59, 68, 87, 359/57, 58, 54, 60; 345/93; 257/59, 72

[56] References Cited

U.S. PATENT DOCUMENTS

| | | | |
|---|---|---|---|
| 4,822,142 | 4/1989 | Yasui ............................. | 359/68 |
| 4,936,656 | 6/1990 | Yamashita et al. ............. | 359/54 |
| 5,132,677 | 7/1992 | Nicholas ........................ | 359/59 |

FOREIGN PATENT DOCUMENTS

| | | | |
|---|---|---|---|
| 1-094323 | 4/1989 | Japan ............................. | 359/59 |

Primary Examiner—Anita Pellman Gross
Assistant Examiner—Walter Malinowski
Attorney, Agent, or Firm—Finnegan, Henderson, Farabow, Garrett & Dunner

[57] ABSTRACT

An active matrix color liquid crystal display panel having a triangular arrangement of picture elements with a redundancy. The panel comprises parallel address buses, data buses orthogonally crossing the address buses, a filter having a triangular arrangement of color picture elements and including a plurality of picture elements and arranged in parallel to the address buses to form a plurality of picture element lines, each of the picture elements having two video signal-applying display electrodes and four picture element-driving switching transistors, and a plurality of filter elements arranged in parallel to the address buses, each of the filter elements being disposed over the display electrodes of each picture element, a liquid crystal filled in a space defined between each filter element and each of the display electrodes of each corresponding picture element, first electric links connecting display electrodes connected to a defective one of the data buses via a first pair of the switching transistors, to another non-defective bus via a second pair of the switching transistors, and second electric links connecting display electrodes connected to a defective one of the address buses via the first pair of the switching transistors, to another non-defective bus via the second pair of the switching transistors.

5 Claims, 11 Drawing Sheets

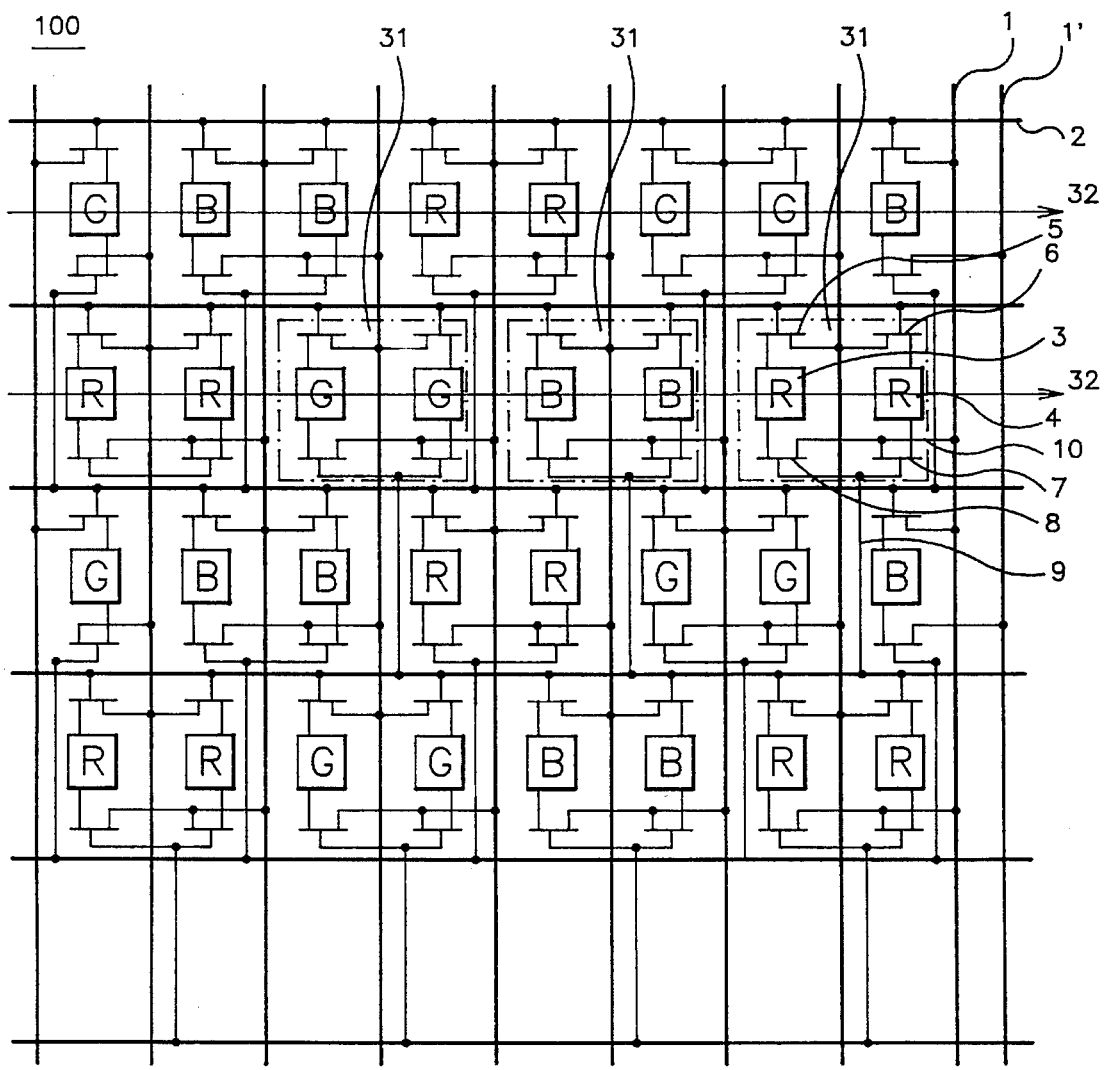
F I G.3

F I G.7
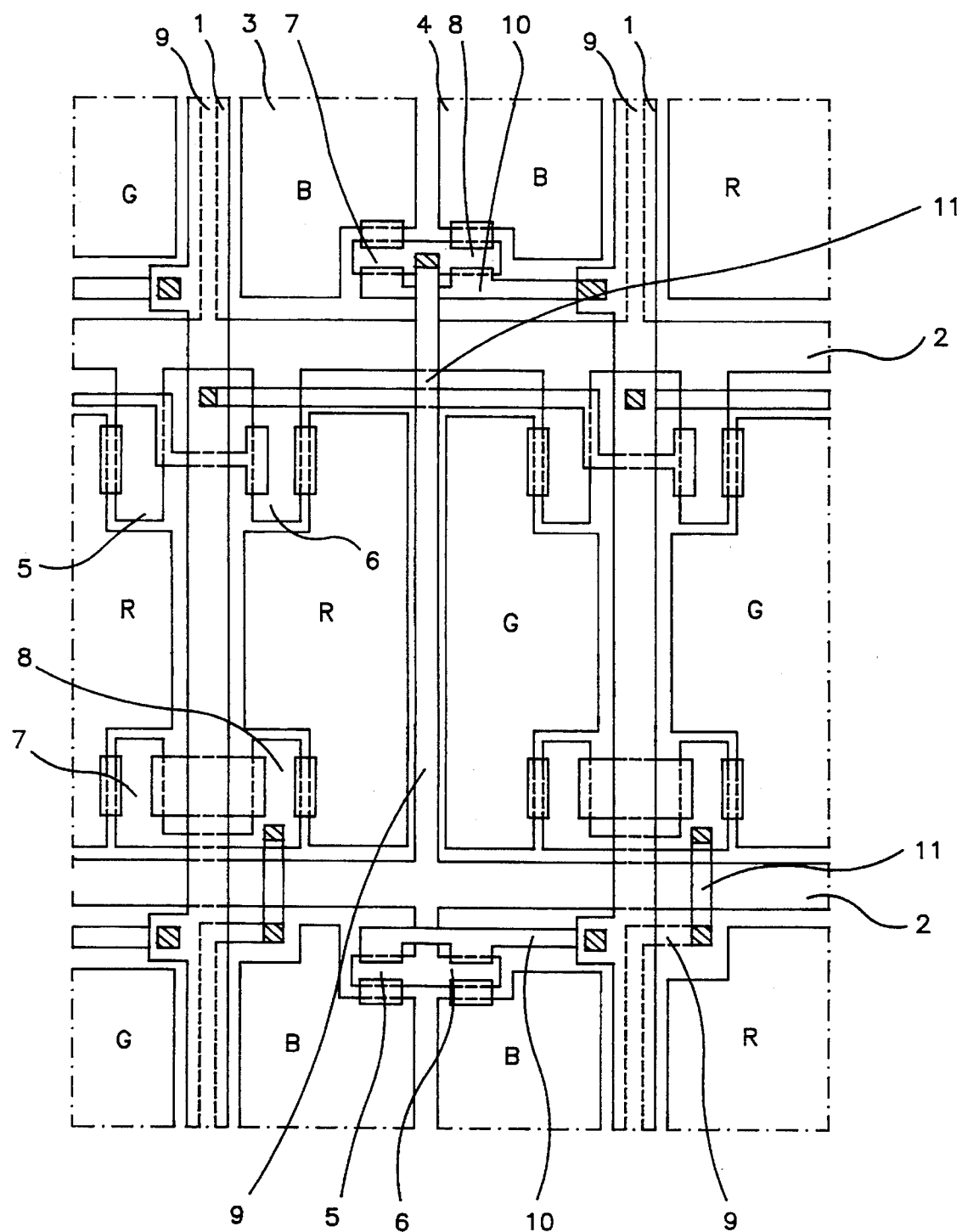

F I G.8
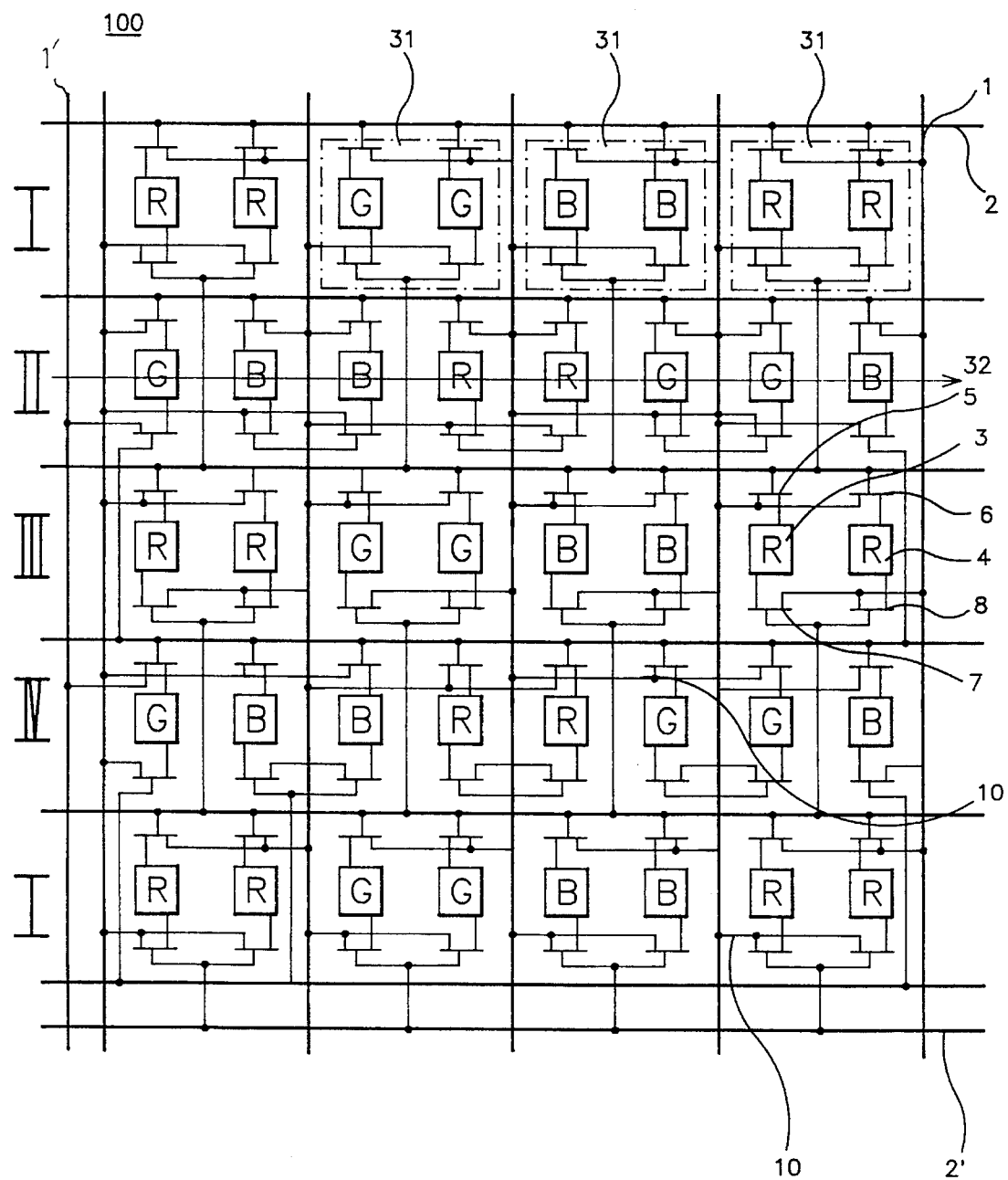

5,457,552

LIQUID CRYSTAL DISPLAY WITH SUBPIXELS EACH HAVING TWO TFTS WHERE SOME TFTS HAVE GATE CONNECTIONS THAT SKIP OVER ADJACENT ADDRESS BUS LINES

BACKGROUND OF THE INVENTION

The present invention relates to an active matrix liquid crystal color display panel having a triangular arrangement of picture elements, and more particularly to a color liquid crystal display panel with redundancy of matrix elements.

Among various types of color display panels the active matrix color display panel in which thin film transistors are used as switching elements has the best image quality.

The active matrix comprises a plurality of picture elements arranged on a transparent insulating substrate in a matrix of lines and columns, each picture element comprising at least one display electrode and one switching transistor.

The matrix further comprises a plurality of address buses disposed between the lines of picture elements and a plurality of data buses disposed between the columns to cross orthogonally the address buses. The display electrodes are connected to the address lines and the data lines via a switching thin film transistor.

Address signals are applied to the thin film transistors (TFTs) whereas video signals are applied to the data buses to be applied to selected ones of the display electrodes via the TFTs turned on by the address signals.

In a color display one picture element comprises at least three picture elements for transmitting primary color components. Therefore, in comparison with a black-and-white display the number of required elements of the cells is three times as large.

The quality of color image depends, to a great extent, on the mutual arrangement of color picture elements.

FIG. 1 is a circuit diagram of a well-known active matrix color liquid crystal display panel. As shown in FIG. 1, the color liquid crystal display panel comprises a plurality of arrays 100 arranged in a matrix of rows and columns. The matrix comprises a plurality of data buses 1 and a plurality of address buses 2. Each picture element denoted by the reference numeral 31 has two display electrodes 3 and 4 disposed on both sides of the corresponding data bus 1 and two switching transistors 5 and 6 respectively connected to the display electrodes 3 and 4. The display electrodes 3 and 4 receive a video signal via the data bus 1 and the switching transistors, TFTs 5 and 6, respectively.

The sources of the switching transistors 5 and 6 are connected to the corresponding display electrodes 3 and 4, respectively. The drains of the switching transistors 5 and 6 are connected in common to the data bus 1 running between the display electrodes 3 and 4. The gates of the switching transistors 5 and 6 are connected in common to a corresponding one of the address buses 2. The display electrodes 3 and 4 are arranged on both sides of the address bus 2, respectively. Each pair of display electrodes 3 and 4 connected to an optional one of data buses 1 is disposed on one side of the corresponding address bus 2 forming lines of picture elements while each corresponding pair of the display electrodes connected to the neighboring data bus 1 is disposed on the other side of the address bus 2.

The display electrodes 3 and 4 labeled as R, G and B are covered with red, green and blue filters, respectively, to constitute color picture elements 31. In the lines 32 of picture elements 31 parallel to the address buses 2, the arrangement of the filters is repeated in the following order: red (R), blue (B) and green (G). The arrangement of the filters is shifted between two neighboring data lines 1 by a half pitch of the repetition cycle of the color filters to form triangular color picture elements which are constituted by two pairs of display electrodes in one line 32 and one pair of display electrodes in a neighboring line 32. Such an arrangement of color elements provides a high quality image.

However, this array design has an essential drawback that an open circuit in one of the data buses 1 or the address buses 2 results in a loss of operability of all picture elements coupled to the detective bus. In other words, the open circuit causes the appearance of line defects in the imaged picture.

There is also known an active matrix liquid crystal color display panel having a triangular arrangement of picture elements which is capable of avoiding a degradation of a high quality image under the influence of a small number of open circuits in the address buses.

Such a panel is illustrated in FIG. 2. Similar to the case of FIG. 1, the panel of FIG. 2 comprises a plurality of arrays 100 arranged in a matrix of rows and columns. Each array 100 comprises a plurality of address buses 1, a plurality of data buses 2 crossing orthogonally the address buses 1, and a plurality of picture elements 31 each constituted by two display electrodes 3 and 4. The display electrodes 3 and 4 of each picture element 31 are connected, via a first pair of switching transistors 5 and 7 and another pair of switching transistors 6 and 8, respectively, to a data bus 2 running between the display electrodes 3 and 4 of the picture element 31 and to two neighboring address buses 1.

The panel of FIG. 2 includes a plurality of red (R), green (G) and blue (B) filters each of which covers two display, electrodes and transmits a predetermined color component. The color filters in combination with the display electrodes are disposed to provide a triangular arrangement of picture elements as shown by the shaded regions in FIG. 2.

Thus, since the color liquid crystal panel has a triangular arrangement of picture elements of different colors, a high quality image can be obtained. Besides each picture element getting a video signal from one data bus via two switching transistors, it is connected to two different address lines by gates of the switching transistors. Therefore, if the address line has an open circuit, the video signal can be supplied to the picture electrode via the switching transistor connected to another address bus. So, the appearance of a small number of open circuits in the address buses does not cause line defects on the picture.

However, this design of color liquid crystal display panel has drawbacks that an open circuit in any of the data buses results in a loss of operability of all picture elements coupled to the defective part of the bus and that the open circuit causes the appearance of line defects on the imaged picture, thereby deteriorating the picture quality. A failure occurring in a considerable number of parts of picture element columns may cause the rejection of the whole panel resulting in a reduction in production yield.

SUMMARY OF THE INVENTION

An object of the invention is to provide an active matrix color liquid crystal display panel having a triangular arrangement of picture elements and which is capable of obtaining a higher picture quality and an increased production yield.

In accordance with the present invention, this object can be accomplished by providing an active matrix liquid crystal display panel comprising: a transparent insulating substrate; a plurality of parallel address buses formed on said transparent insulating substrate; a plurality of data buses formed on the transparent insulating substrate to cross orthogonally said address buses; a filter including a plurality of picture element electrodes formed on a transparent insulating substrate, each of said picture elements having first and second display electrodes and four switching transistors, said first and second display electrodes being disposed in neighboring spaces in the direction of said address buses between two address buses and two data buses forming picture element lines between neighboring address buses, the sources of the first and second ones of said switching transistors being connected to the first display electrode, the sources of the third and fourth ones of the switching transistors being connected to the second display electrode, the gates of the first and third switching transistors being connected to the address bus disposed between the picture element line in which said picture element is arranged and the preceding line, the drains of the first and third switching transistors being connected to the data bus running between the first and second display electrodes of the picture element, picture elements of each line being shifted relative to the picture elements of the neighboring lines with a half pitch of the repetition cycle of the picture elements, and a plurality of filter elements having various color components and arranged periodically in the same direction as the address buses to form lines of filter elements of red, green and blue, the repetition cycle of the first to third elements in one of the two neighboring lines including two first elements, two second elements and two third elements arranged in this order, while in the other line the repetition cycle including one first element, two third elements and one second element arranged in this order; and a liquid crystal filled in a space defined between each filter element and each of the display electrodes of each corresponding picture element; said panel being characterized in that: the gates of the second and fourth switching transistors of each picture element are connected to the address bus running between two picture element lines following the present picture element line via second connection lines, respectively; the gates of the second and fourth switching transistors for each picture element disposed in the last picture element line are connected to the first address bus of the following row array via first electric links, respectively; the drains of the second and fourth switching transistors of each picture elements are connected to the data bus running between the picture element and the following picture element of the same picture element line via the second connection lines; and the drain of the last switching transistor of the second line of the two neighboring filter element lines is connected to the first data bus of the next column array via the second connection lines.

So, distinctive features of the present invention are that the gates of the second and fourth switching transistors for each picture element disposed in the last picture element line are connected to the first address bus of the following row array via first electric links, respectively, the drains of the second and fourth switching transistors of each picture elements are connected to the data bus running between the picture element and the following picture element of the same picture element line via the second connection lines, and the drain of the last switching transistor of the second line of the two neighboring filter element lines is connected to the first data bus of the next column array via the second connection lines.

The use of the foregoing distinctive features in combination with the features of the prior art enables the present invention to achieve the object of creating an active matrix color liquid crystal panel having a triangular arrangement of picture elements, improved image quality, and increased production yield because linear defects do not occur even when an open circuit appears in the address buses or the data buses.

As mentioned above, the appearance of an open circuit in any of the data buses in the conventional matrices causes the loss of operability of picture elements connected to the defective bus and the appearance of the linear defects in the picture.

On the contrary, in the panel structure according to the present invention each picture element constituted by two display electrodes and four switching transistors is connected not only to two address buses, but also to two data buses.

As a result, the appearance of an open circuit in one data bus does not cause the loss of operability of the picture elements connected to the defective part of this bus, because the video signal is applied to the picture elements through the second data bus.

The failure of the operability of the picture elements in the structure of the present invention may occur only when open circuits appear simultaneously in the two buses to which the picture elements are connected. However, the possibility of simultaneous appearance of open circuits in both buses is very little. Thus, the present invention makes possible the achievement of the above-mentioned object.

BRIEF DESCRIPTION OF THE DRAWINGS

The above and other objects, features and advantages of the present invention will be more clearly understood from the following detailed description taken in conjunction with the accompanying drawings, in which:

FIG. 3 is a plan view of a part of a liquid crystal display panel in accordance with a first embodiment of the present invention;

FIG. 7 is a layout view of a TFT matrix of the liquid crystal color panel of FIG. 6;

FIG. 8 is a plan view of a part of a liquid crystal display panel in accordance with a third embodiment of the present invention;

DETAILED DESCRIPTION OF THE PREFERRED EMBODIMENTS

Figure 1:
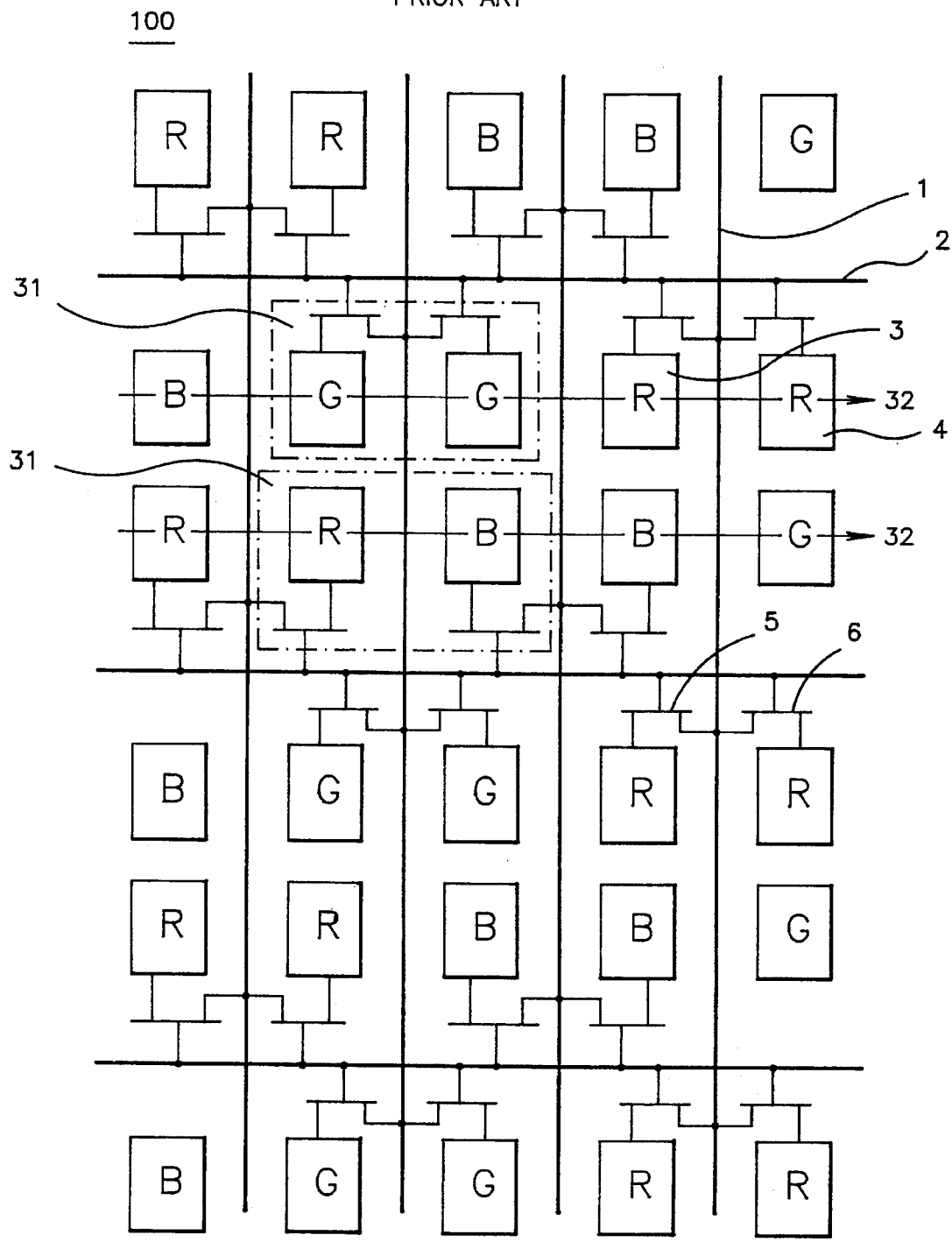
FIG. 1 is a circuit diagram of a conventional active matrix color liquid crystal display panel having a triangular arrangement of picture elements.
Figure 2:
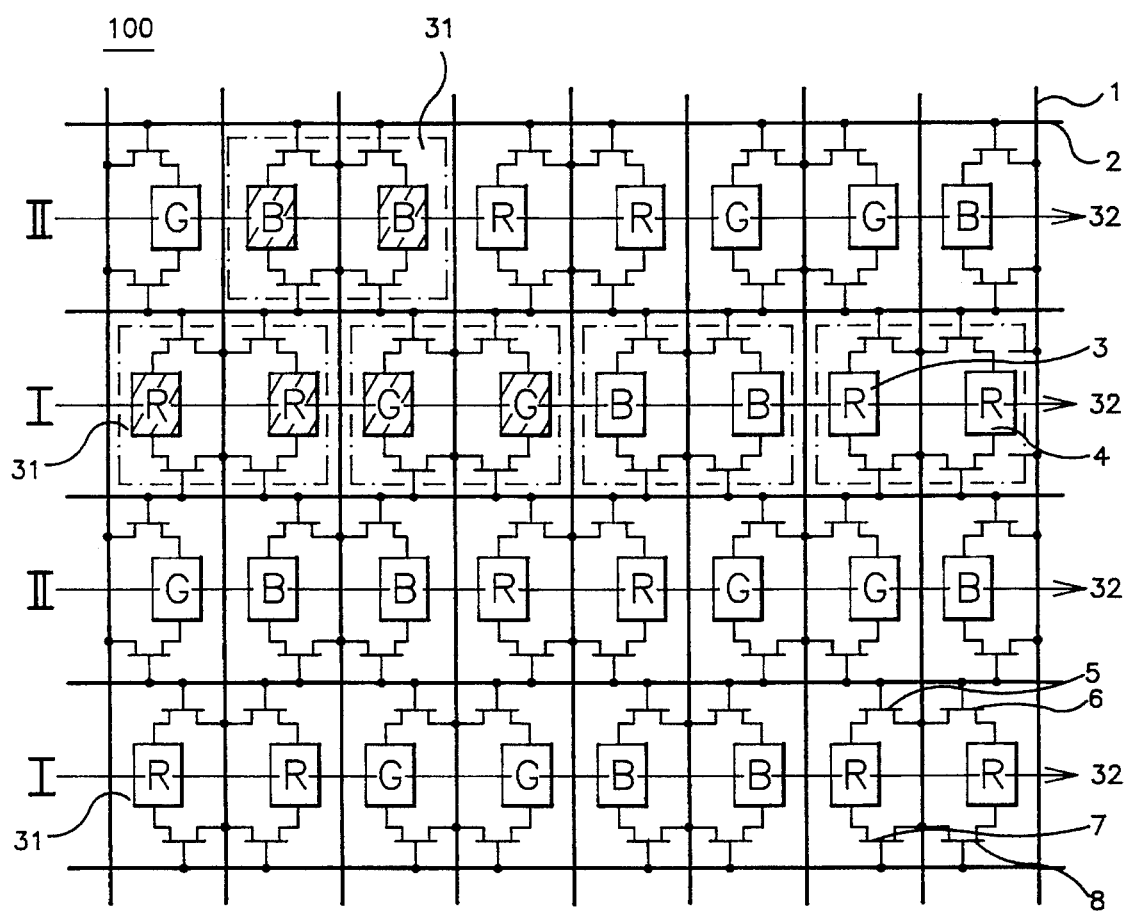
FIG. 2 is a partial plan view of a conventional active matrix color liquid crystal display panel having a triangular arrangement of picture elements each connected to two address buses.

FIG. 3 is a plan view of a part of a liquid crystal display panel in accordance with a first embodiment of the present invention. The illustrated part of the panel is a TFT active matrix array 100 formed on a glass substrate. The panel includes a plurality of arrays 100 arranged in a matrix of columns and rows.

The matrix array 100 comprises a plurality of data buses 1, a plurality of picture elements each constituted by two display electrodes 3 and 4 associated with four switching transistors 5 to 8.

The display electrodes 3 and 4 of each picture element are simultaneously connected via the switching transistors 5 to 8 to two address buses 2 one of which is disposed between the line 32 in which this picture element is arranged and the preceding line while the other bus is disposed between two following lines. The switching transistors 7 and 8 for each picture element are connected in common to one data bus 1 by means of an electric link 10, as shown in FIG. 3.

The switching transistors 7 and 8 for each picture element disposed in the last picture element line are connected to the first address bus 2' of the following row array 100 via an electric link 9. On the other hand, the switching transistor 7 for the incomplete picture element disposed at the end of each picture element line is connected to the first data bus 1' of the following column array 100.

In FIG. 3, the arrangement of the color filter elements over the display electrodes is indicated by the labels R, G and B.

Operation of the liquid crystal display panel of FIG. 3 will now be described.

During one period of matrix scanning, a video signal is supplied to the display electrodes 3 and 4 of each picture element twice. The first video signal is applied through the switching transistors 5 and 6 while the second video signal is applied through the switching transistors 7 and 8. Since the second video signal is a subsequent signal shifted relative to the first signal with the time necessary for addressing one line, each picture element of the matrix is finally driven by the second video signal.

Where an open circuit appears in the data bus or the address bus to which the display electrodes 3 and 4 are connected via the switching transistor 7 an 8, only the first video signal will be supplied to the display electrodes 3 and 4. On the other hand, where an open circuit appears in the data bus or the address bus to which the display electrodes 3 and 4 are connected via the switching transistor 5 an 6, only the second video signal will be supplied to the display electrodes 3 and 4. Thus the appearance of an open circuit does not cause the failure of the picture elements connected to the defective part of the bus.

Figure 4:
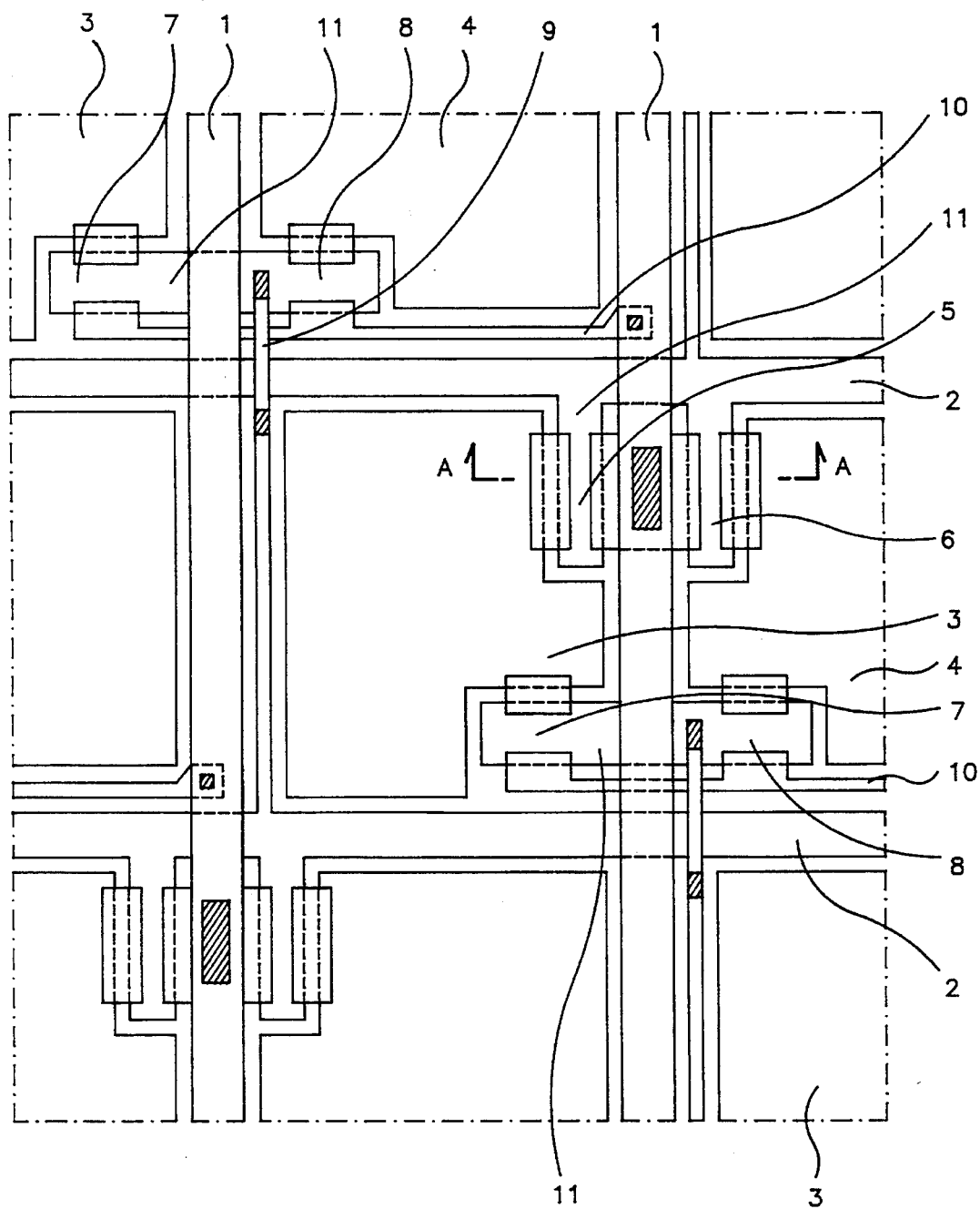
FIG. 4 is a layout view of a TFT matrix of the liquid crystal color panel of FIG. 3.

The layout of an arbitrarily selected part of the TFT matrix of the liquid crystal color panel in accordance with the present invention is illustrated in FIG. 4.

In FIG. 4, there are shown the data buses 1, the address buses 2, the display electrodes 3 and 4, the switching transistors 5 to 8, the electric links 9 for connecting the gates 11 of switching transistors 7 and 8 to the address buses 2, and the electric links 10 for connecting the drains of switching transistors 7 and 8 to the address buses 2.

Figure 5:
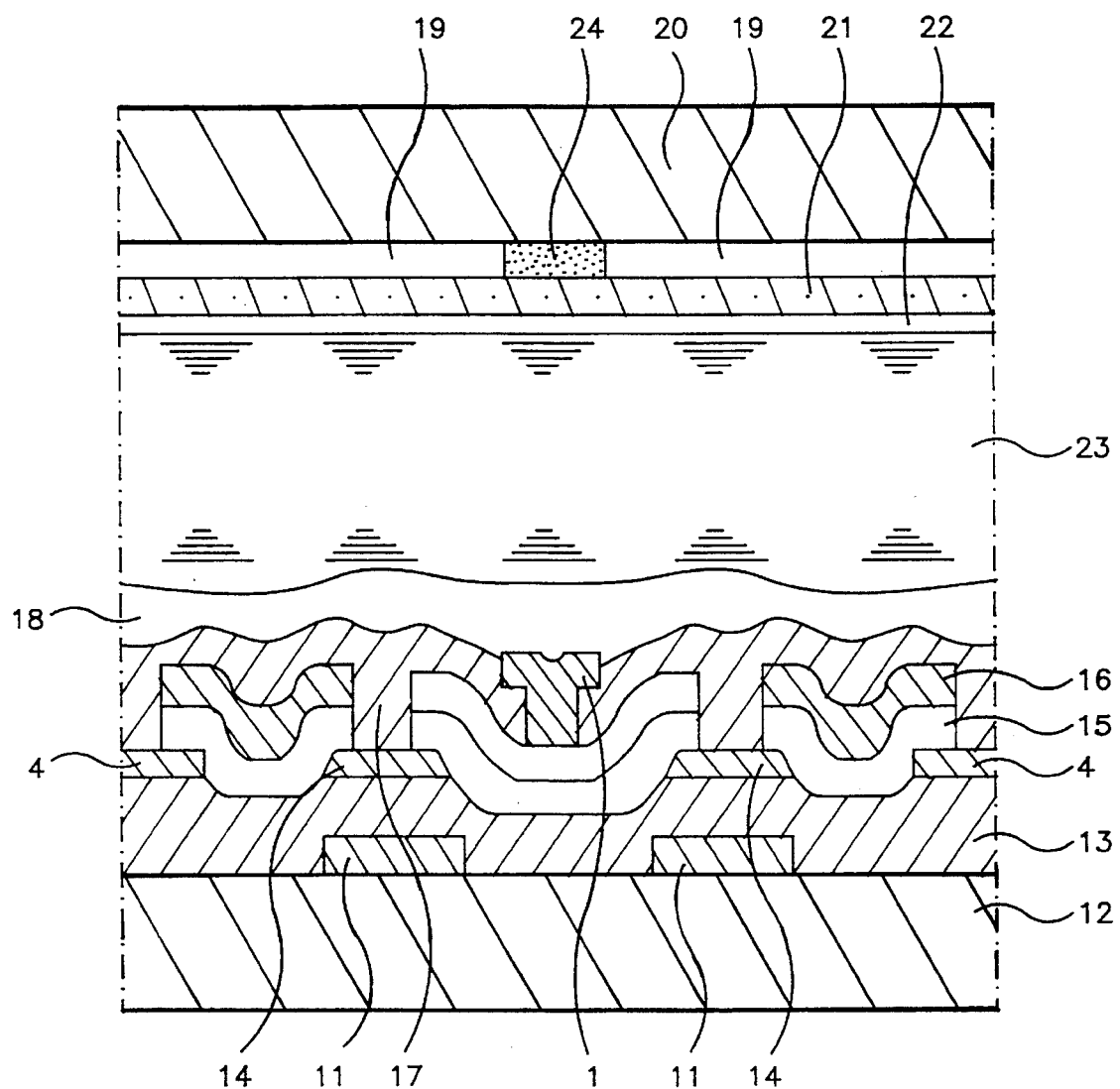
FIG. 5 is a cross-sectional view taken along the line A—A of FIG. 4.

In FIG. 5, a cross-sectional structure of the liquid crystal color display panel taken along the line A—A of FIG. 4 is shown. The structure shown in FIG. 5 is fabricated in accordance with the following method.

A chromium film is deposited over a glass substrate 12 and then patterned by use of the photolithography to form the address buses 2 (not shown) and the gates 11 of switching transistors 7 and 8.

Thereafter, a silicon nitride film 13 to be used as a gate dielectric film is deposited over the entire exposed surface of the resulting structure. Over the silicon nitride film 13, an amorphous silicon film is deposited. The amorphous silicon film is then patterned by use of the photolithography to form semiconductor regions 14 for the switching transistors. A transparent indium oxide film deposited over the entire exposed surface of the resulting structure and then patterned by use of the photolithography, thereby forming the display electrodes 3 and 4. Over the entire exposed surface of the resulting structure, a molybdenum silicide film 15 and a chromium film 16 are sequentially deposited. These films 15 and 16 are then patterned by use of the photolithography to form the sources and drain electrodes of switching transistors and the electric links (not shown in FIG. 5).

Subsequently, a silicon nitride film 7 to be used as a protective dielectric film is deposited over the entire exposed surface of the resulting structure by use of the photolithography, thereby forming the switching transistors, the address buses, the drain electrodes of switching transistors 5 and 6, and contact windows for the electric links 10.

An aluminum film is then deposited over the entire exposed surface of the resulting structure. Then, the aluminum film is patterned by use of the photolithography to form the data buses 1 and the electric links 9 (not shown in FIG. 5). Over the entire exposed surface of the resulting structure, a polyimide film 18 to be used as an orientation layer for a liquid crystal is then deposited.

On the other hand, a color filter layer 19 is formed on a transparent substrate 20. The filter layer 19 is then covered with a transparent conductive film 21 comprised of an indium oxide film to be used as a common electrode for each liquid crystal cell. Over the common electrode 21, a polyimide layer 22 is then deposited so as to serve as an orientation layer for a liquid crystal.

At a final step of the fabrication process for the active matrix color liquid crystal display panel, a liquid crystal 23 is filled in a space defined between the color filter layer 19 and the TFT matrix.

In the structure fabricated in accordance with the first embodiment of the present invention, the drains of switching transistors 7 and 8 for each picture element are connected to the data bus disposed between the picture element and the following picture element of the same picture element line, as shown in FIG. 3. Although not shown, the drains may be connected to the data bus disposed between the picture element and the preceding picture element of the same picture element line.

Figure 6:
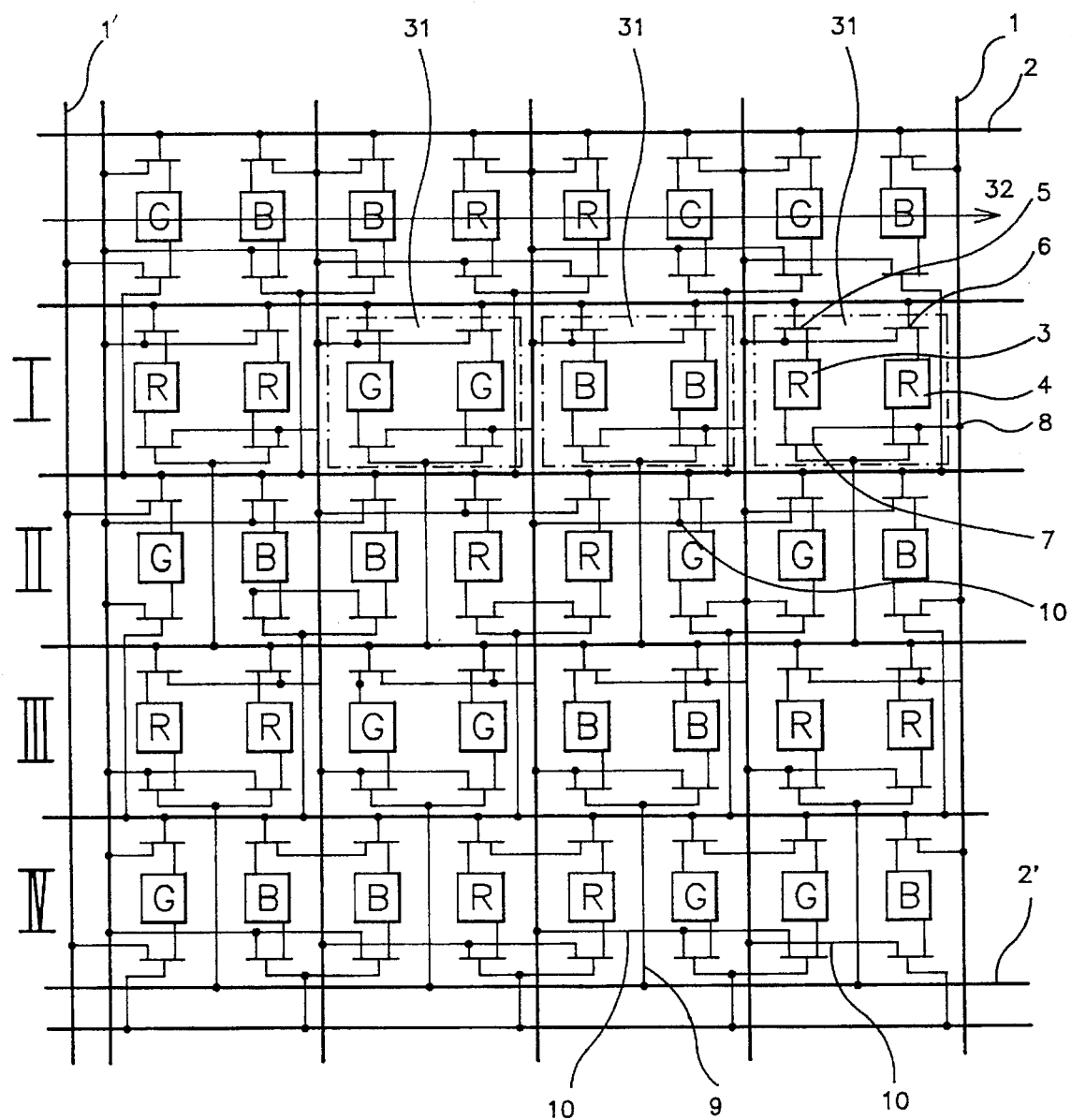
FIG. 6 is a plan view of a part of a liquid crystal display panel in accordance with a second embodiment of the present invention.

FIG. 6 is a plan view of a part of a liquid crystal display panel in accordance with a second embodiment of the present invention. The liquid crustal display panel of the second embodiment has a structure wherein each data bus runs between adjacent pairs of display electrodes, as compared to the structure of the first embodiment wherein each data bus runs between adjacent display electrodes. Although the first embodiment has the arrangement of color filters with a repetition cycle of two lines I and II, the second embodiment has the arrangement of color filters with a repetition cycle of four lines I to IV.

In accordance with the second embodiment, in the first line I the drains of the first and third switching transistors 5 and 6 of each picture element are connected in common to the data bus 1 running between the picture element and the preceding picture element of the same picture element line while the drains of the second and fourth switching transistors 7 and 8 of each picture element are connected in common to the data bus 1 running between the picture element and the following picture element of the same picture element line.

In the second line II, the drains of the first and third switching transistors 5 and 6 of each picture element are connected in common to the data bus 1 running between the display electrodes 3 and 4 of the preceding picture element of the same picture element line while the drains of the second and fourth switching transistors 7 and 8 of each picture element are connected in common to the data bus 1 running between the display electrodes 3 and 4 of the picture element.

In the third line III, the drains of the first and third switching transistors 5 and 6 of each picture element are connected in common to the data bus 1 running between the picture element and the following picture element of the same picture element line while the drains of the second and fourth switching transistors 7 and 8 of each picture element are connected in common to the data bus 1 running between the picture element and the preceding picture element of the same picture element line, in contrast to the first line I.

In the fourth line IV, the drains of the first and third switching transistors 5 and 6 of each picture element are connected in common to the data bus 1 running between the display electrodes 3 and 4 of the picture element while the drains of the second and fourth switching transistors 7 and 8 of each picture element are connected in common to the data bus 1 running between the display electrodes 3 and 4 of the preceding picture element of the same picture element line, in contrast to the second line II.

The gates of the first and third switching transistors 5 and 6 of each picture element are connected to the address bus running between the present picture element line in which the present picture element is arranged and the picture element line preceding the present picture element. On the other hand, the gates of the second and fourth switching transistors 7 and 8 of each picture element are connected to the address bus running between two picture element lines following the present picture element line via the electric link 9.

The gates of the second and fourth switching transistors 7 and 8 of each picture element of the last picture element line are connected to the first address bus 2' of the following row array via the electric link 9. The drain of the first transistor 5 of the second line II and the drain of the second transistor 7 of the fourth line IV are connected to the last data bus 1' of the preceding column array.

FIG. 7 shows a layout of the active matrix liquid crystal display panel of FIG. 6.

As shown in FIG. 7, each data bus runs between adjacent pairs of display electrodes, as compared to the structure of the first embodiment in which each data bus runs between adjacent display electrodes. In the structure of the second embodiment, each electric link 9 runs between adjacent display electrodes between which no data bus runs.

FIG. 8 is a plan view of a part of a liquid crystal display panel in accordance with a third embodiment of the present invention. The liquid crystal display panel of the third embodiment has the same structure as that of the second embodiment, except for the arrangement of color filters of each array.

Figure 9:
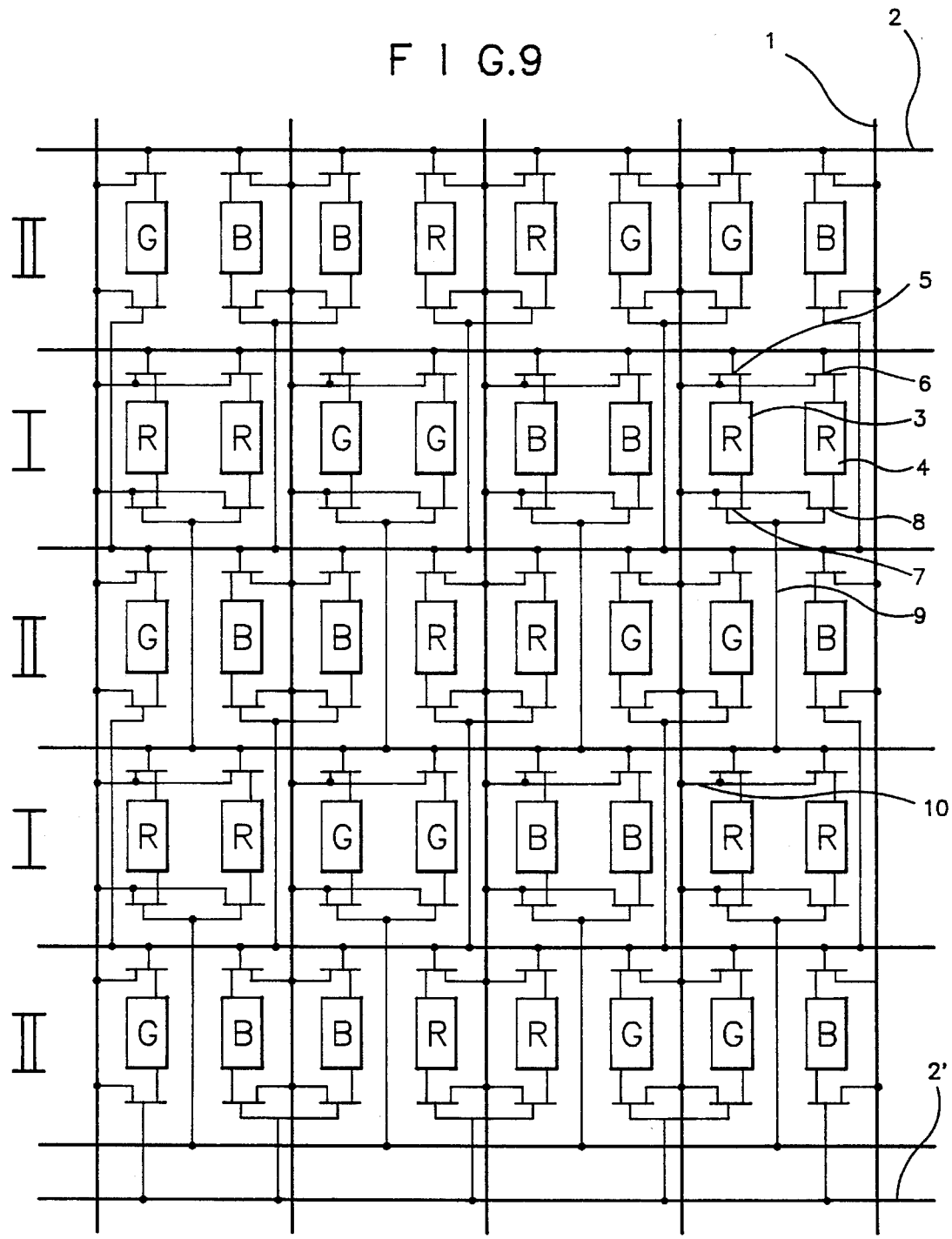
FIG. 9 is a plan view of a part of a liquid crystal display panel in accordance with a fourth embodiment of the present invention.

FIG. 9 is a plan view of a part of a liquid crystal display panel in accordance with a fourth embodiment of the present invention. In similar to the second embodiment, the liquid crystal display panel of the fourth embodiment has a structure wherein each data bus runs between adjacent pairs of display electrodes. In this structure, the arrangement of color filters is the same as that of the first embodiment.

In accordance with the fourth embodiment, in the first line I the drains of the first and third switching transistors 5 and 6 of each picture element are connected in common to the data bus 1 running between the picture element and the preceding picture element of the same picture element line while the drains of the second and fourth switching transistors 7 and 8 of each picture element are connected in common to the data bus 1 running between the picture element and the following picture element of the same picture element line.

In the second line II, the drains of the first to fourth switching transistors 5 to 8 of each picture element are connected in common to the data bus 1 running between the display electrodes 3 and 4 of the picture element. The gates of the second and fourth switching transistors 7 and 8 of each picture element are connected in common to the data bus 1 running between two pixel element lines following 6he present picture element line via electric links 9. On the other hand, the gates of the second and fourth switching transistors 7 and 8 of each picture element of the last picture element line are connected to the first address bus 2 of the following row array. The drain of the last switching transistor 7 of the line II is connected to the last data bus of the present array.

The second to fourth embodiments achieve an increase in aperture ratio by virtue of the structure wherein each data bus runs between adjacent pairs of display electrodes. Similar to the first embodiment, the second to fourth embodiments also obtain a redundancy of gate and data lines.

Figure 10:
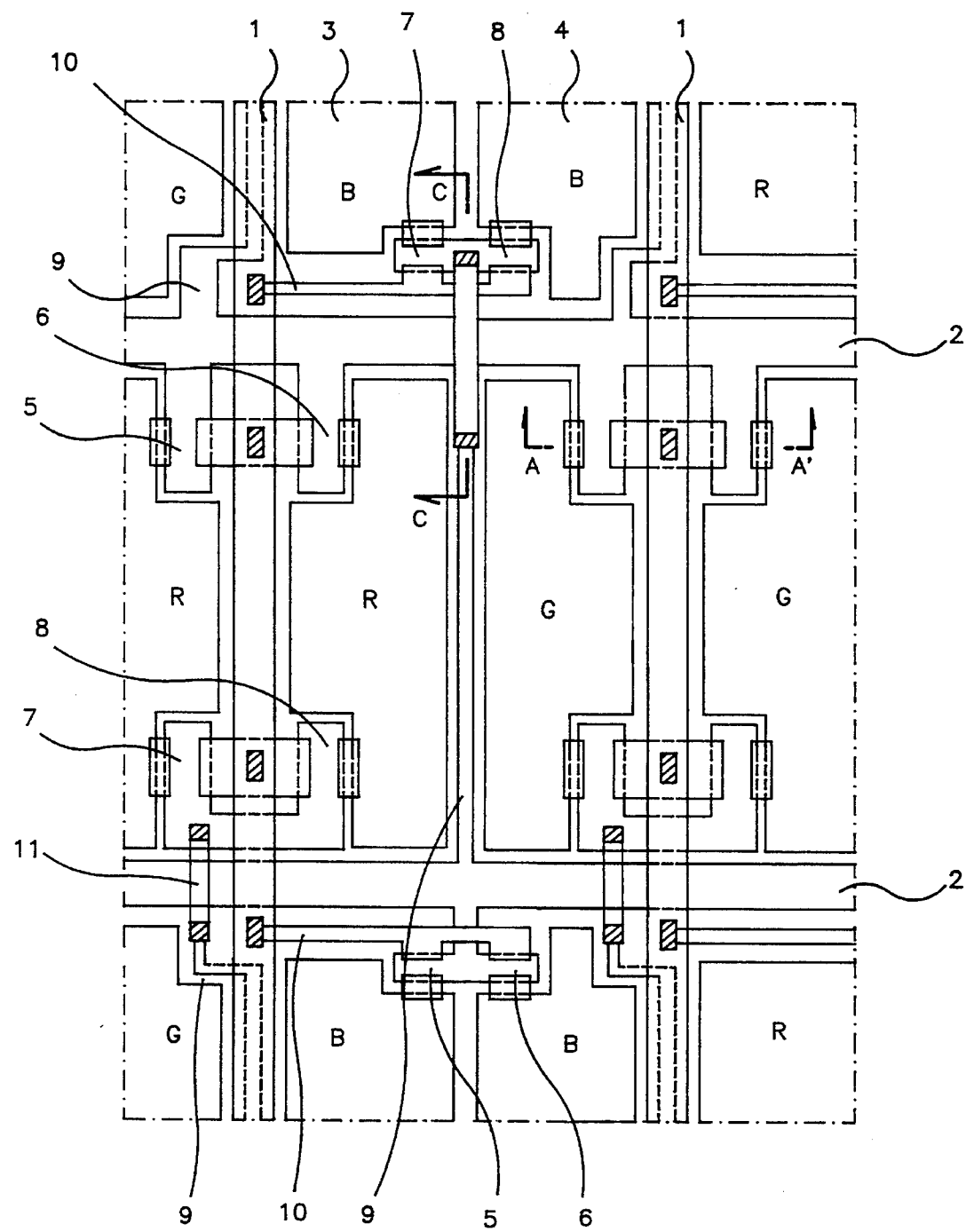
FIG. 10 is a layout view of a TFT matrix of the liquid crystal color panel of FIG. 9.
Figure 11:
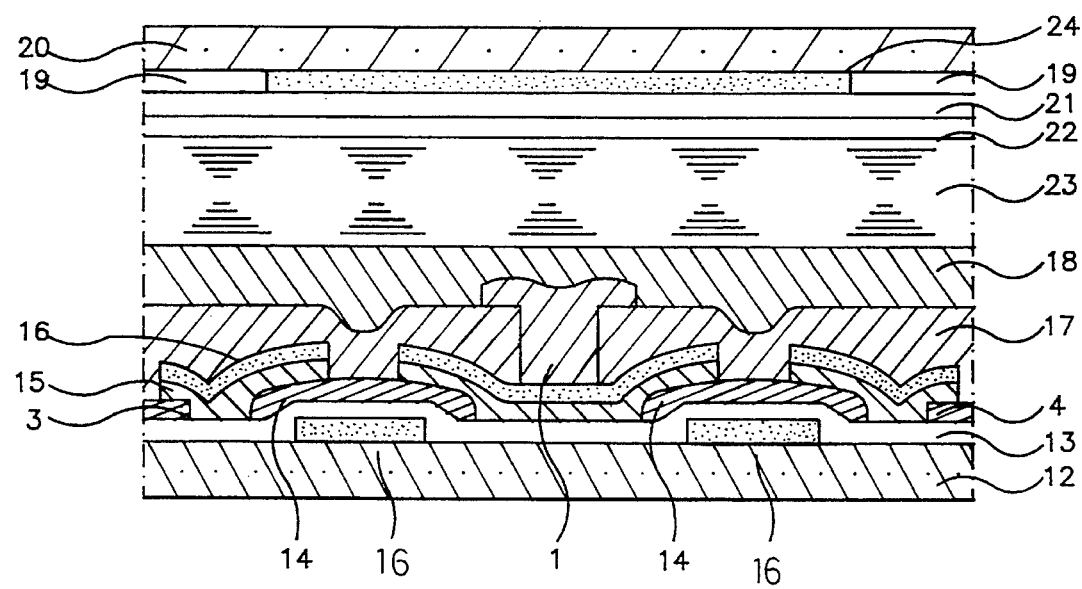
FIG. 11 is a cross-sectional view taken along the line A—A of FIG. 10.
Figure 12:
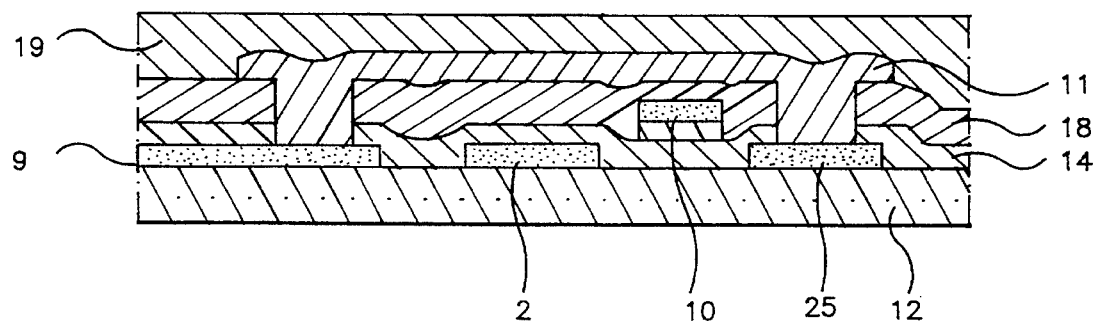
FIG. 12 is a cross-sectional view taken along the line C—C of FIG. 10.

FIG. 10 is a partial layout view of the liquid crystal display panel designed in accordance with the fourth embodiment. FIGS. 11 and 12 are cross-sectional views taken along the lines A—A and C—C of FIG. 10, respectively.

As apparent from the above description, the present invention provides a liquid crystal display panel having a structure in which display electrodes of each picture element are connected to two data buses, thereby capable of eliminating line defects of the image picture occurring when an open circuit appears in data buses, improving the aperture ratio, and increasing the production yield.

Moreover, the present invention requires no additional steps for obtaining the above-mentioned structure because the electric links 9 and 10 are integrated in the fabrication of the active matrix. Where other additional manufacturing steps are required, the transistors 7 and 8 may also be separated from the address buses and data buses by burning the electric links 9 and 10 by use of laser beams.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An active matrix liquid crystal display panel comprising:

a transparent insulating substrate;

a plurality of parallel address buses formed on said transparent insulating substrate;

a plurality of data buses formed on the transparent insulating substrate to cross orthogonally said address buses;

filter means having a triangular arrangement of color picture elements, said filter means including a plurality of picture elements formed on the transparent insulating substrate and arranged in parallel to the address buses to form a plurality of picture element lines, each of said picture elements having two video signal-applying display electrodes and four picture element-driving switching transistors, and a plurality of filter elements arranged in parallel to the address buses, each of said filter elements being disposed over said display electrodes of each picture element;

a liquid crystal filled in a space defined between each filter element and each of the display electrodes of each corresponding picture element;

first connection line means for connecting display electrodes connected to a defective one of said data buses via a first pair of said switching transistors, to another non-defective bus via a second pair of said switching transistors; and second connection line means for connecting display electrodes connected to a defective one of said address buses via the first pair of said switching transistors, to another non-defective bus via the second pair of said switching transistors.

2. An active matrix liquid crystal display panel comprising:

a transparent insulating substrate;

a plurality of parallel address buses formed on said transparent insulating substrate;

a plurality of data buses formed on the transparent insulating substrate to cross orthogonally said address buses;

a filter including a plurality of picture element electrodes formed on a transparent insulating substrate, each of said picture elements having first and second display electrodes and four switching transistors, said first and second display electrodes being disposed in neighboring spaces in a direction of said address buses between two address buses and two data buses forming picture element lines between neighboring address buses, sources of first and second ones of said switching transistors being connected to the first display electrode, sources of third and fourth ones of the switching transistors being connected to the second display electrode, gates of the first and third switching transistors being connected to the address bus disposed between the picture element line in which said picture element is arranged and a preceding picture element line, drains of the first and third switching transistors being connected to the data bus running between the first and second display electrodes of the picture element, picture elements of each line being shifted relative to the picture elements of neighboring lines with a half pitch of a repetition cycle of the picture elements, and a plurality of filter elements having various color components and arranged periodically in the same direction as the address buses to form lines of filter elements of red, green and blue, the repetition cycle of the first to third elements in one of the two neighboring lines including two first elements, two second elements and two third elements arranged in this order, while in another line the repetition cycle including one first element, two third elements and one second element arranged in this order; and a liquid crystal filled in a space defined between each filter element and each of the display electrodes of each corresponding picture element;

wherein:

the gates of the second and fourth switching transistors of each picture elements are connected to the address bus running between two picture element lines following the present picture element line via second connection lines, respectively;

the gates of the second and fourth switching transistors for each picture element disposed in the last picture element line are connected to the first address bus of the following row array via first connection line, respectively;

the drains of the second and fourth switching transistors of each picture elements are connected to the data bus running between the picture element and the following picture element of the same picture element line via the second connection lines; and the drain of the last switching transistor of the second line of the two neighboring filter element lines is connected to the first data bus of the next column array via the second connection lines.

3. An active matrix liquid crystal display panel comprising:

a transparent insulating substrate;

a plurality of parallel address buses formed on said transparent insulating substrate;

a plurality of data buses formed on the transparent insulating substrate to cross orthogonally said address buses;

a filter including a plurality of picture element electrodes formed on the transparent insulating substrate, each of said picture elements having first and second display electrodes and four switching transistors, sources of first and second ones of said switching transistors being connected to the first display electrode, sources of third and fourth ones of the switching transistors being connected to the second display electrode, gates of the first and third switching transistors being connected to the address bus disposed between the picture element line in which said picture elements is arranged and a preceding picture element line, picture elements of each line being shifted relative to the picture elements of neighboring lines with a half pitch of a repetition cycle of the picture elements, and a plurality of filter elements having various color components and arranged periodically in the same direction as the address buses to form lines of filter elements of red, green and blue, the repetition cycle of the first to third elements in one of the two neighboring lines including two first elements, two second elements and two third elements arranged in this order, while in another line the repetition cycle including one second element, two third elements, two first elements and one third element arranged in this order; and a liquid crystal filled in a space defined between each filter element and each of the display electrodes of each corresponding picture element;

wherein:

said first and second display electrodes of each picture element in one of the two neighboring lines being arranged in the same direction as the address buses in a space defined by two data buses and two address buses while in the other line each of the first and second display electrodes of each picture element being arranged with one of the display electrodes of the adjacent picture element neighboring in the same direction as the address buses in a space defined by two data buses and two address buses;

the drains of the first and third switching transistors of each picture element in said one line are connected to the data bus running between the picture element and the preceding picture element of the same picture element line while the drains of the second and fourth switching transistors of each picture element are connected to the data bus running between the picture element and the following picture element of the same picture element line;

the drains of the first and third switching transistors of each picture element in a line preceding the one line are connected to the data bus running between the display electrodes of the picture element while the drains of the second and fourth switching transistors of each picture element are connected to the data bus running between the display electrodes of the preceding picture element of the same picture element line via second connection lines;

the drains of the first and third switching transistors of each picture element in the other line are connected to the data bus running between the display electrodes of the preceding picture element of the same picture element line via the second connection lines while the drains of the second and fourth switching transistors of each picture element are connected to the data bus running between the display electrodes of the picture element;

the drains of the first and third switching transistors of each picture element in a line following the other line are connected in common to the data bus running between the picture element and the following picture element of the same picture element line while the drains of the second and fourth switching transistors of each picture element are connected to the data bus running between the picture element and the preceding picture element of the same picture element line;

the gates of the second and fourth switching transistors of each picture element are connected to the address bus running between two picture element lines following the present picture element line via first connection lines;

the gates of the second and fourth switching transistors for each picture element disposed in the last picture element line are connected to the first address bus of the following row array via first connection lines; and the drain of the first switching transistor of the second line of the two neighboring filter element lines is connected to the last data bus of the preceding column array.

4. An active matrix liquid crystal display panel comprising:

a transparent insulating substrate;

a plurality of parallel address buses formed on said transparent insulating substrate;

a plurality of data buses formed on the transparent insulating substrate to cross orthogonally said address buses;

a filter including a plurality of picture element electrodes formed on the transparent insulating substrate, each of said picture elements having first and second display electrodes and four switching transistors, sources of first and second ones of said switching transistors being connected to the first display electrode, sources of third and fourth ones of the switching transistors being connected to the second display electrode, gates of the first and third switching transistors being connected to the address bus disposed between the picture element line in which said picture element is arranged and a preceding line, picture elements of each address buses in a space defined by two data buses and two address buses;

the drains of the first and third switching transistors of each picture element in the one line are connected to the data bus running between the display electrodes of the picture element while the drains of the second and fourth switching transistors of each picture element are connected to the data bus running between the display electrodes of the preceding picture element of the same picture element line via second connection lines;

the drains of the first and third switching transistors of each picture element in said one are connected in common to the data bus running between the picture element and the following picture element of the same picture element line while the drains of the second and fourth switching transistors of each picture element are connected to the data bus running between the picture element and the preceding picture element of the same picture element line;

the drains of the first and third switching transistors of each picture element in said other line are connected to the data bus running between the picture element and the preceding picture element of the same picture element line via the second connection lines while the drains of the second and fourth switching transistors of each picture element are connected to the data bus running between the picture element and the following picture element of the same picture element line via the second connection lines;

the drains of the first and third switching transistors of each picture element of a line following the other line are connected to the data bus running between the display electrodes of the preceding picture element of the same picture element line via the second connection lines while the drains of the second and fourth switching transistors of each picture element are connected to the data bus running between the display electrodes of the picture element;

the gates of the second and fourth switching transistors of each picture element are connected to the address bus running between two picture element lines following the same picture element line via first connection lines;

the gates of the second and fourth switching transistors for each picture element disposed in the last picture element line are connected to the first address bus of the following row array via first connection lines; and the drain of the first switching transistor of the first line of the two neighboring filter element lines is connected to the last data bus of the preceding column array.

5. An active matrix liquid crystal display panel comprising:

a transparent insulating substrate;

a plurality of parallel address buses formed on said transparent insulating substrate;

a plurality of data buses formed on the transparent insulating substrate to cross orthogonally said address buses;

a filter including a plurality of picture element electrodes formed on the transparent insulating substrate, each of said picture elements having first and second display electrodes and four switching transistors, sources of first and second ones of said switching transistors being connected to the first display electrode, sources of third and fourth ones of the switching transistors being connected to the second display electrode, gates of the first and third switching transistors being connected to the address bus disposed between the picture element line in which said picture element is arranged and a preceding line, picture elements of each line being shifted relative to the picture elements of neighboring lines with a half pitch of a repetition cycle of the picture elements, and a plurality of filter elements having various color components and arranged over the display electrodes periodically in the same direction as the address buses to form lines of filter elements of red, green and blue, the repetition cycle of the first to third elements in two neighboring lines each including two first elements, two second elements and two third elements arranged in this order while in another line the repetition cycle including one second element, two third elements, two first elements and one third element arranged in this order; and a liquid crystal filled in a space defined between each filter element and each of the display electrodes of each corresponding picture element;

wherein:

said first and second display electrodes of each picture element in one of the two neighboring lines being arranged in the same direction as the address buses in a space defined by two data buses and two address buses while in the other line each of the first and second display electrodes of each picture element being arranged with one of the display electrodes of the adjacent picture element neighboring in the same direction as the address buses in a space defined by two data buses and two address buses;

the drains of the first and third switching transistors of each picture element in said one line are connected to the data bus running between the picture element and the preceding picture element of the same picture element line via second connection lines while the drains of the second and fourth switching transistors of each picture element are connected to the data bus running between the picture element and the preceding picture element of the same picture element line via second connection lines;

the drains of the first to fourth switching transistors of each picture element in the other line are connected to the data bus running between the display electrodes of the picture element;

the gates of the second and fourth switching transistors of each picture element are connected to the address bus running between two picture element lines following the present picture element line via first connection lines;

the gates of the second and fourth switching transistors for each picture element disposed in the last picture element line are connected to the first address bus of the following row array via first connection lines; and the drain of the last switching transistor of the second line of the two neighboring filter element lines is connected to the last data bus of the present array.

* * * * *

UNITED STATES PATENT AND TRADEMARK OFFICE
CERTIFICATE OF CORRECTION

PATENT NO. : 5,457,552
DATED : October 10, 1995
INVENTOR(S) : Oleg F. OGURTSOV et al.

It is certified that error appears in the above-indentified patent and that said Letters Patent is hereby corrected as shown below:

Claim 4, Column 12, Line 12, after " each " insert --line being shifted relative to the picture elements of neighboring lines with a half pitch of a repetition cycle of the picture elements, and a plurality of filter elements having various color components and arranged over the display electrodes periodically in the same direction as the address buses to form lines of filter elements of red, green and blue; and a liquid crystal filled in a space defined between each filter element and each of the display electrodes of each corresponding picture element; wherein:

said repetition cycle of the first to third elements including two neighboring lines including two first elements, two second elements and two third elements includes one second element, two third elements, two first elements and one third element arranged in this order in one of the two neighboring lines while in the other line the repetition cycle includes

UNITED STATES PATENT AND TRADEMARK OFFICE
CERTIFICATE OF CORRECTION

PATENT NO. : 5,457,552
DATED : October 10, 1995
INVENTOR(S) : Oleg F. OGURTSOV et al It is certified that error appears in the above-indentified patent and that said Letters Patent is hereby corrected as shown below:

two first elements, two second elements and
two third elements arranged in this order;
    said first and second display electrodes of
each picture element in one of the two
neighboring lines being arranged with one of
the display electrodes of the adjacent picture
element neighboring in the same direction as the
address buses in a space defined by two data
buses and two address buses while in the other
line each of the first and second display
electrodes of each picture element being
arranged in the same direction as the--

Signed and Sealed this

Thirteenth Day of August, 1996

*Attest:*

BRUCE LEHMAN

*Attesting Officer*   Commissioner of Patents and Trademarks